US012794157B2

(12) United States Patent
Zhang et al.

(10) Patent No.: US 12,794,157 B2
(45) Date of Patent: Nov. 10, 2026

(54) TERMINAL, CONNECTOR AND CONNECTOR ASSEMBLY

(71) Applicants: Tyco Electronics Technology (SIP) Ltd., Suzhou (CN); Tyco Electronics (Shanghai) Co., Ltd., Shanghai (CN)

(72) Inventors: Weidong Zhang, Shanghai (CN); Wenzheng Ma, Suzhou (CN); Jian Wang, Suzhou (CN); Pengsheng Jiang, Suzhou (CN); Zaiyun Bai, Suzhou (CN)

(73) Assignees: Tyco Electronics (Shanghai) Co., Ltd., Shanghai (CN); Tyco Electronics Technology (SIP) Ltd., Suzhou (CN)

( * ) Notice: Subject to any disclaimer, the term of this patent is extended or adjusted under 35 U.S.C. 154(b) by 422 days.

(21) Appl. No.: 18/485,583

(22) Filed: Oct. 12, 2023

(65) Prior Publication Data

US 2024/0128671 A1 Apr. 18, 2024

(30) Foreign Application Priority Data

Oct. 13, 2022 (CN) ........................ 202222697206.7

(51) Int. Cl.

| | |
|---|---|
| ***H01R 13/11*** | (2006.01) |
| *H01R 4/02* | (2006.01) |
| *H01R 4/18* | (2006.01) |
| *H01R 13/42* | (2006.01) |

(52) U.S. Cl.

CPC .............. *H01R 13/11* (2013.01); *H01R 4/023* (2013.01); *H01R 4/184* (2013.01); *H01R 13/42* (2013.01)

(58) Field of Classification Search

CPC ........ H01R 13/11; H01R 4/023; H01R 4/184; H01R 13/42

USPC ...................................................... 439/733.1

See application file for complete search history.

(56) References Cited

U.S. PATENT DOCUMENTS

| | | | | |
|---|---|---|---|---|
| 5,431,576 A * | 7/1995 | Matthews | H01R 13/6315 | 439/247 |
| 5,588,884 A * | 12/1996 | Rudoy | H01R 31/02 | 439/787 |
| 6,416,340 B2 * | 7/2002 | Schaefer | H01R 13/187 | 439/224 |
| 6,692,316 B2 * | 2/2004 | Hsieh | H01R 13/5205 | 439/224 |
| 7,450,660 B2 * | 11/2008 | Hasegawa | H04L 27/362 | 375/225 |
| 7,581,972 B2 * | 9/2009 | Daamen | H01R 13/6315 | 439/249 |
| 7,678,995 B2 * | 3/2010 | Hengel | H01R 4/4881 | 174/88 B |
| 8,128,441 B2 * | 3/2012 | Mukuno | H01R 13/187 | 439/845 |

(Continued)

*Primary Examiner* — Harshad C Patel

(74) *Attorney, Agent, or Firm* — Barley Snyder

(57) ABSTRACT

A terminal comprises a terminal body including a pair of terminal plates spaced opposite each other in a height direction, and a pair of elastic contact members arranged on respective inner sides of the pair of terminal plates. Each elastic contact member includes an elastic arm having an extension direction inclined with respect to a length direction of the terminal body. The elastic arms are adapted to clamp to a mating terminal inserted therebetween along the extension direction to achieve electrical connection between the terminal and the mating terminal.

20 Claims, 6 Drawing Sheets

(56) References Cited

U.S. PATENT DOCUMENTS

| | | | | |
|---|---|---|---|---|
| 8,388,389 | B2 * | 3/2013 | Costello | H01R 13/26<br>439/637 |
| 8,419,486 | B2 * | 4/2013 | Tyler | H01R 13/187<br>439/845 |
| 8,664,530 | B2 * | 3/2014 | Ross | H01R 25/14<br>174/70 B |
| 8,668,531 | B2 * | 3/2014 | Yamaguchi | H01R 13/187<br>439/845 |
| 8,827,754 | B2 * | 9/2014 | Lee | H01R 13/187<br>439/845 |
| 8,827,755 | B2 * | 9/2014 | Blakborn | H01R 13/113<br>439/845 |
| 9,520,703 | B2 * | 12/2016 | Jaena | H02G 5/08 |
| 9,559,467 | B1 * | 1/2017 | Khorrami | H01R 13/6581 |
| 9,680,236 | B2 * | 6/2017 | Ngo | H01R 4/48 |
| 9,871,309 | B2 * | 1/2018 | Gao | H01R 4/302 |
| 10,050,394 | B2 * | 8/2018 | Aporius | H01R 25/145 |
| 10,230,191 | B2 * | 3/2019 | Lui | H01R 13/187 |
| 10,256,560 | B2 * | 4/2019 | Fertig | H01R 13/35 |
| 10,855,014 | B1 * | 12/2020 | Wu | H01R 13/187 |
| 11,545,775 | B2 * | 1/2023 | Liu | H01R 13/187 |
| 11,984,682 | B2 * | 5/2024 | Chae | H01R 4/4863 |
| 12,107,359 | B2 * | 10/2024 | Zhang | H01R 13/113 |
| 12,294,171 | B2 * | 5/2025 | Reedy | H01R 13/187 |
| 12,431,665 | B2 * | 9/2025 | Carvalho | H01R 13/187 |
| 2012/0156947 | A1 * | 6/2012 | Tyler | H01R 13/113<br>439/842 |
| 2022/0209431 | A1 * | 6/2022 | Zhang | H01R 13/113 |

* cited by examiner

TERMINAL, CONNECTOR AND CONNECTOR ASSEMBLY

CROSS-REFERENCE TO RELATED APPLICATION

This application claims the benefit of Chinese Patent Application No. CN202222697206.7 filed on Oct. 13, 2022, in the State Intellectual Property Office of China, the whole disclosure of which is incorporated herein by reference.

FIELD OF THE INVENTION

The present invention relates to a terminal, a connector including the terminal, and a connector assembly including the connector.

BACKGROUND

A terminal of a high-voltage connector typically includes a terminal body and a pair of elastic contact members. The terminal body also generally includes two terminal plates. A gap is defined between the two terminal plates that allows for the insertion of a mating terminal. A pair of elastic contact members are set in the gap between two terminal plates and fixed to respective inner sides of the two terminal plates. The elastic contact members are used to clamp the mating terminal inserted between them to achieve electrical connection between the terminal and the mating terminal.

However, in prior art terminals, the extension direction of the elastic arm on the elastic contact member is usually in the length or width direction of the terminal body. This results in mating terminal being inserted between the pair of elastic contact members only along the length or width direction of the terminal body. In this way, the mating direction between terminal and mating terminal can only be the length or width direction of the terminal body, which limits the range of use of connector.

SUMMARY

According to an embodiment of the present disclosure, a terminal comprises a terminal body including a pair of terminal plates spaced opposite each other in a height direction, and a pair of elastic contact members installed or arranged on respective inner sides of the pair of terminal plates. Each elastic contact member includes an elastic arm having an extension direction inclined at a non-right angle with respect to a length direction of the terminal body. The elastic arms are adapted to clamp to a mating terminal inserted therebetween along the extension direction to achieve electrical connection between the terminal and the mating terminal.

BRIEF DESCRIPTION OF THE DRAWINGS

The invention will now be described by way of example with reference to the accompanying Figures, of which.

DETAILED DESCRIPTION OF THE EMBODIMENTS

Figure 1:
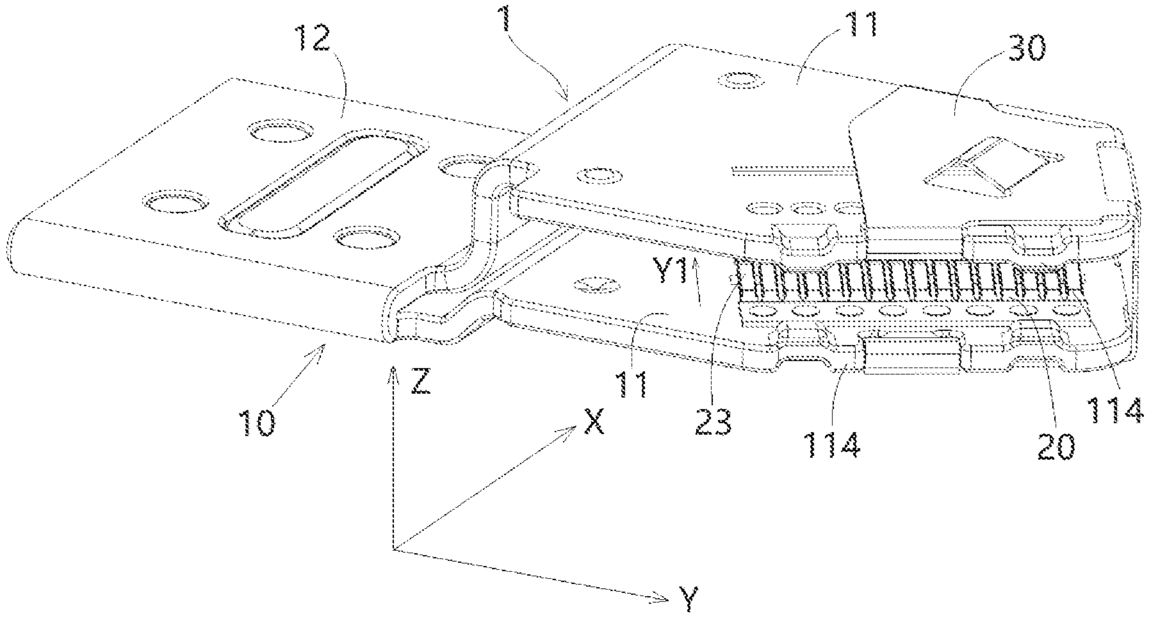
FIG. 1 is an illustrative perspective view of a terminal according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a terminal body includes a pair of terminal plates spaced opposite each other in its height direction, and a pair of elastic contact members installed on respective inner sides of the pair of terminal plates. Each elastic contact member includes an elastic arm having an extension direction that is inclined to the length direction of the terminal body. In embodiments, an angle between the direction of extension and the length direction is not equal to 90 degrees (i.e., a non-right angle). The elastic arms of the pair of elastic contact members are adapted to clamp a mating terminal inserted between them along the extension direction to achieve electrical connection between the terminal and the mating terminal. According to embodiment of the present disclosure, a connector comprises a housing, and the above described terminal inserted therein. Another embodiment of the present disclosure includes a connector assembly. The connector assembly comprises above described connector, and a mating connector mated with the connector. A mating terminal of the mating connector is inserted into the connector along the extension direction of the elastic arm of the elastic contact member of the connector.

Figure 2:
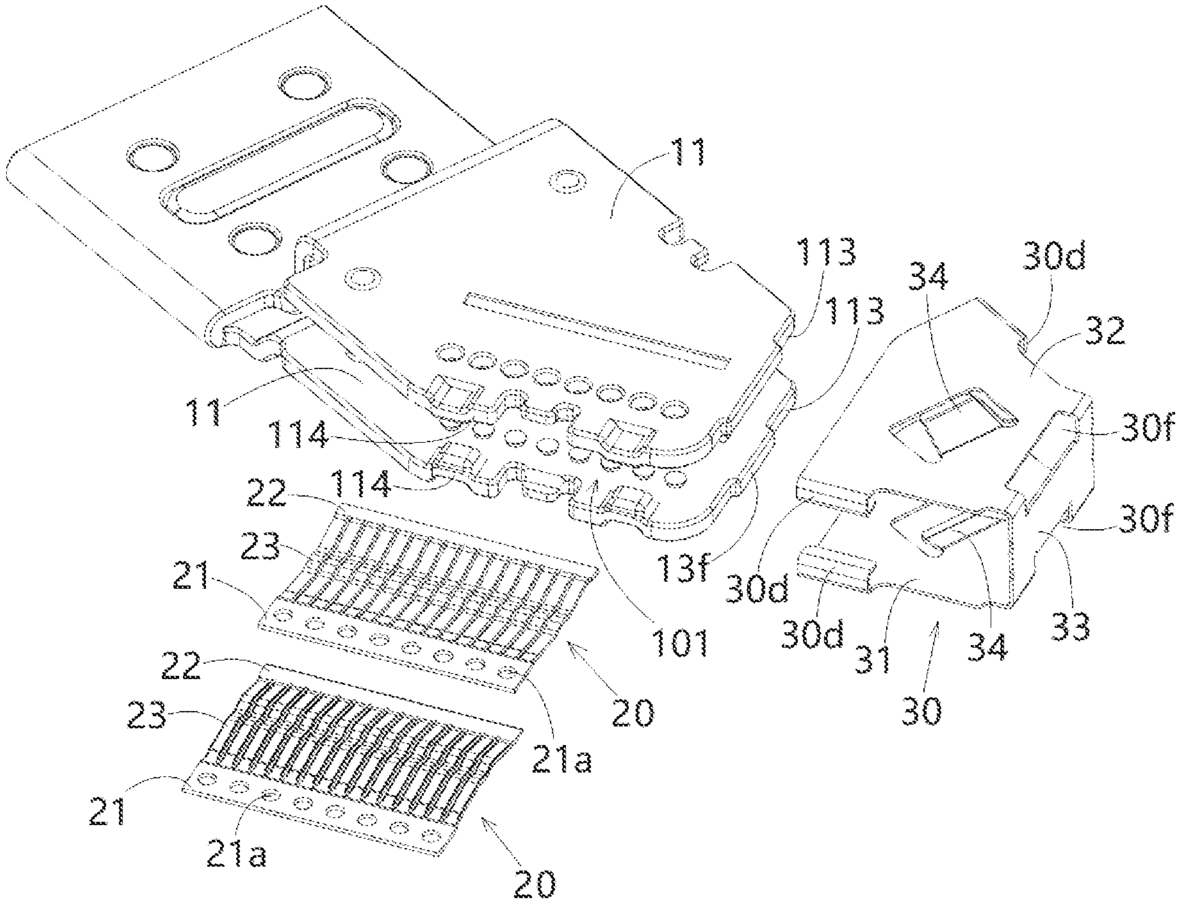
FIG. 2 is an illustrative exploded view of a terminal according to an exemplary embodiment of the present invention.
Figure 3:
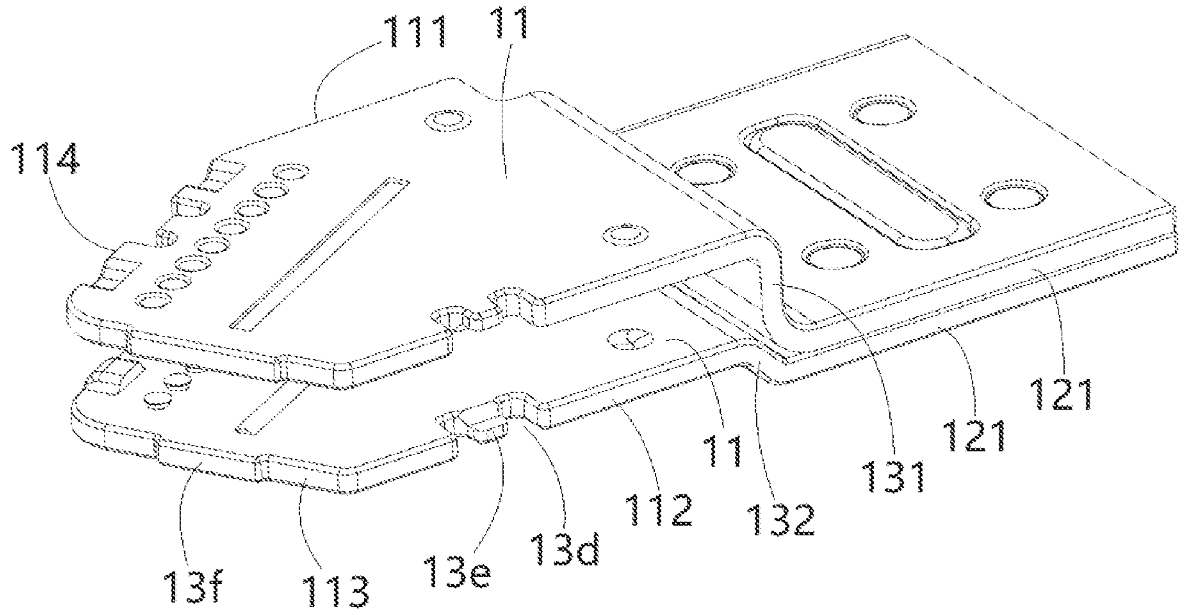
FIG. 3 is an illustrative perspective view of a terminal body according to an exemplary embodiment of the present invention.
Figure 4:
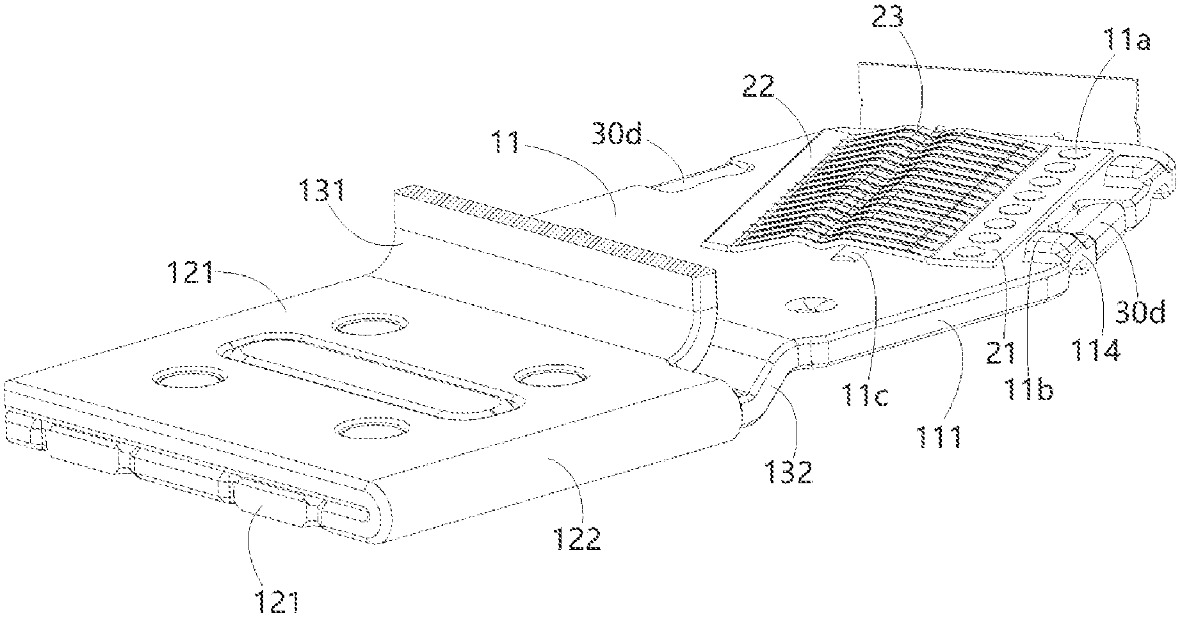
FIG. 4 is a cross-sectional view of a terminal according to an exemplary embodiment of the present invention, showing the terminal plate at the bottom of the terminal body and the elastic contact member installed on it.
Figure 5:
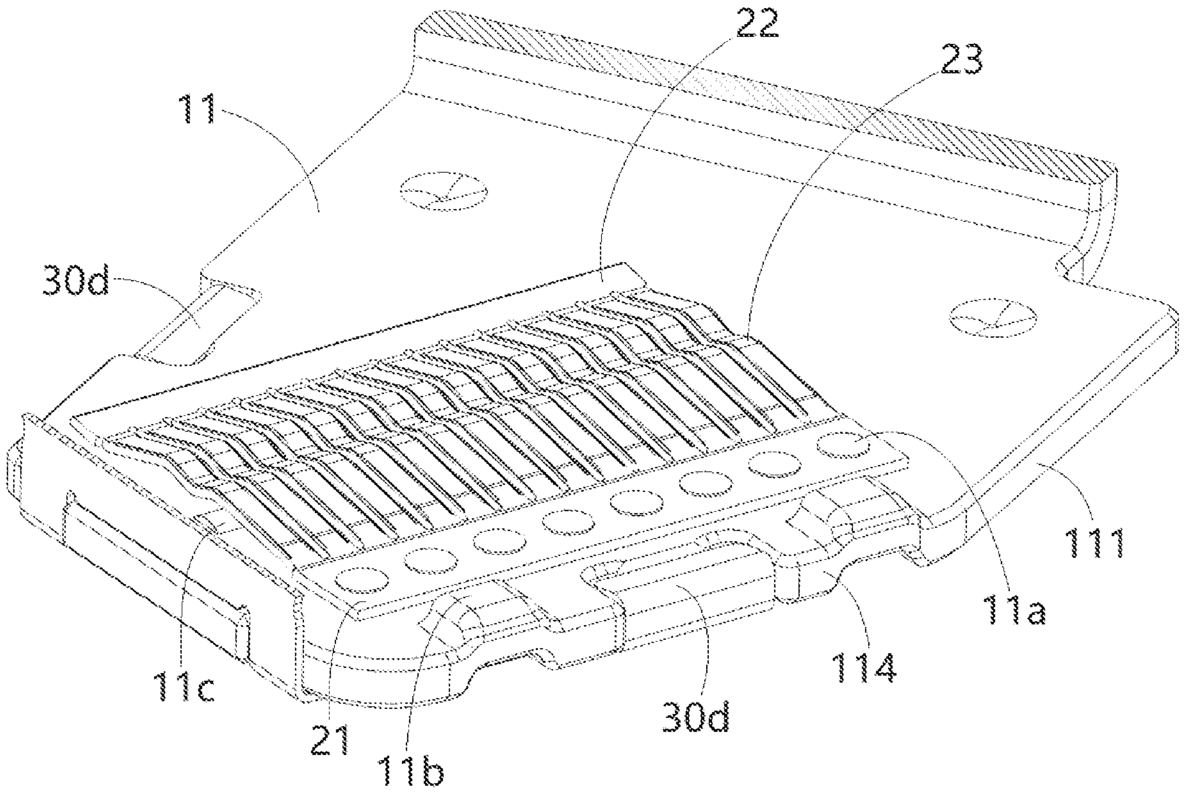
FIG. 5 is a cross-sectional view of a terminal according to an exemplary embodiment of the present invention, showing the terminal plate at the top of the terminal body and the elastic contact member installed on it.

FIG. 1 is an illustrative perspective view of a terminal 1 according to an exemplary embodiment of the present invention. FIG. 2 is an illustrative exploded view of the terminal 1 according to an exemplary embodiment of the present invention. FIG. 3 is an illustrative perspective view of a terminal body 10 according to an exemplary embodiment of the present invention. FIG. 4 is a cross-sectional view of the terminal 1 according to an exemplary embodiment of the present invention, showing a terminal plate 11 at the bottom of the terminal body 10 and an elastic contact member 20 installed thereon. FIG. 5 shows a cross-sectional view of the terminal 1 according to an exemplary embodiment of the present invention, showing the terminal plate 11 at the top of the terminal body 10 and the elastic contact member 20 installed thereon.

As shown in FIGS. 1-5, in an exemplary embodiment of the present invention, the terminal 1 includes the terminal body 10 and the pair of elastic contact members 20. The terminal body 10 includes a pair of the terminal plates 11 spaced opposite each other in its height direction Z. The pair of elastic contact members 20 are respectively installed on the inner sides of the pair of terminal plates 11 and each includes an elastic arm 23.

An extension direction Y1 of the elastic arm 23 is inclined to the length direction Y of the terminal body 10. An angle between the extension direction Y1 of the elastic arm 23 and the length direction Y of the terminal body 10 is not equal to 90 degrees. The elastic arms 23 of the pair of elastic contact members 20 are suitable for clamping a mating terminal (not shown) inserted between them along the extension direction Y1, in order to achieve electrical connection between the terminal and the mating terminal. Therefore, in the present invention, the mating direction between the mating terminal and the terminal 1 is inclined towards the length direction of the terminal body 10, thereby expanding the application range of the connector.

In an exemplary embodiment of the present invention, the angle between the extension direction Y1 of the elastic arm 23 and the length direction Y of the terminal body 10 is greater than 90 degrees and less than 180 degrees. For example, the angle between the extension direction Y1 of elastic arm 23 and the length direction Y of terminal body 10 can be equal to 100 degrees, 120 degrees, 140 degrees, or 160 degrees.

The elastic contact member 20 includes multiple elastic arms 23 arranged in a row along a direction perpendicular to the extension direction Y1 of the elastic arms 23. The terminal plate 11 has an inclined side edge 114, which is perpendicular to the extension direction Y1 of the elastic arm 23. The terminal body 10 has a mating port 101 located between the inclined side edges 114 of the pair of terminal plates 11 for inserting the mating terminal.

The elastic contact member 20 further includes a first side edge portion 21 and a second side edge portion 22 that are opposite to each other in the extension direction Y1 of the elastic arm 23. The elastic arm 23 is connected between the first side edge portion 21 and the second side edge portion 22. The first side edge portion 21 is arranged proximate to the inclined side edge 114 and fixed to the inner side of the terminal plate 11, while the second side edge portion 22 is distal or farther from the inclined side edge 114 and sliding supported on the inner side of the terminal plate 11.

A riveting hole 21*a* is formed in the first side edge portion 21. A protruding riveting part or rivet 11*a* is formed on the inner side of the terminal plate 11. The riveting part 11*a* is riveted into the riveting hole 21*a* to rivet the first side edge portion 21 to the inner side of the terminal plate 11. The first side edge portion 21 and the second side edge portion 22 extend in a direction perpendicular to the extension direction Y1 of the elastic arm 23. Multiple riveting holes 21*a* are formed in the first side edge portion 21, and the multiple riveting holes 21*a* are arranged in a row along the extension direction of the first side edge portion 21. Multiple riveting parts 11*a* are formed on the terminal plate 11, and the multiple riveting parts 11*a* are arranged in a row along the extension direction of the first side edge portion 21.

A pair of support protrusions 11*b* are formed on the inner side of the terminal plate 11. The pair of support protrusions 11*b* are respectively located at both ends of the inclined side edge 114 and extend along the extension direction Y1 of the elastic arm 23. The support protrusion 11*b* on the pair of terminal plates 11 is used to support the mating terminal inserted between the pair of elastic contact members 20. This prevents the elastic arm 23 from being excessively pressed by the mating terminal.

A raised rib 11*c* is formed on the inner side of the terminal plate 11. The raised rib 11*c* extends in a direction perpendicular to the extension direction Y1 of the elastic arm 23. The raised rib 11*c* on terminal plate 11 is used to support the elastic arm 23 to prevent excessive deformation of the elastic arm.

The terminal plate 11 also has a first side edge 111 and a second side edge 112 that are opposite to each other in the width direction X of the terminal body 10. The terminal plate 11 further includes as a third side edge 113 connected between one end of the second side edge 112 and one end of the inclined side edge 114. The inclined side edge 114 is connected between one end of the first side edge 111 and one end of the third side edge 113. The first side edge 111 and the second side edge 112 extend along the length direction Y of the terminal body 10, and the third side edge 113 is perpendicular to the inclined side edge 114.

As shown in FIGS. 1-5, in the illustrated embodiment, the terminal 1 further includes a locking member 30, which is sleeved on the ends of the pair of terminal plates 11 of terminal body 10 to lock the terminal 1 in a connector housing (not shown). The locking member 30 includes a bottom plate 31, a top plate 32, and an end plate 33. The bottom plate 31 is fixed to the outer side of one terminal plate 11. The top plate 32 is fixed to the outer side of the other terminal plate 11. The end plate 33 is connected between the bottom plate 31 and the top plate 32. End plate 33 faces the third side edges 113 of the pair of terminal plates 11 and is pressed against the third side edge 113.

A positioning notch 13*d* and a limiting tongue 13*e* extending into the positioning notch 13*d* are formed on each of the inclined side edge 114 and the second side edge 112 of the terminal plate 11. An elastic clamping part 30*d* is formed on the side edge of each of the bottom plate 31 and the top plate 32 of the locking member 30. The elastic clamping part 30*d* is positioned in the positioning notch 13*d* and clamps the limiting tongue 13*e*.

A positioning protrusion 13*f* is formed on the third side edge 113 of the terminal plate 11. A positioning slot hole 30*f* is formed on the end plate 33 of the locking member 30. The positioning protrusion 13*f* is assembled into the positioning slot hole 30*f* A locking spring 34 is formed on each of the bottom plate 31 and top plate 32 of the locking member 30. The locking spring 34 is adapted to engage with the connector housing to lock the terminal 1 in the connector housing.

The terminal body 10 further includes a welding part 12, a first bending part 131, and a second bending part 132. The welding part 12 is used for welding to a conductor end of a wire/cable (not shown). The welding part 12 includes a pair of welding plates 121 and a bent connection part 122. The pair of welding plates 121 are stacked up and down and riveted together with each other. The bent connection part 122 is connected between one sides of the pair of welding plates 121. The first bending part 131 is connected between one end of one welding plate 121 and one end of one terminal plate 11. The second bending part 132 is connected between one end of the other welding plate 121 and one end of the other terminal plate 11.

In the illustrated embodiment, the terminal body 10 is an integral stamped piece. This can reduce manufacturing costs. Similarly, the elastic contact member 20 and/or the locking member 30 can also be an integral stamped piece.

Figure 6:
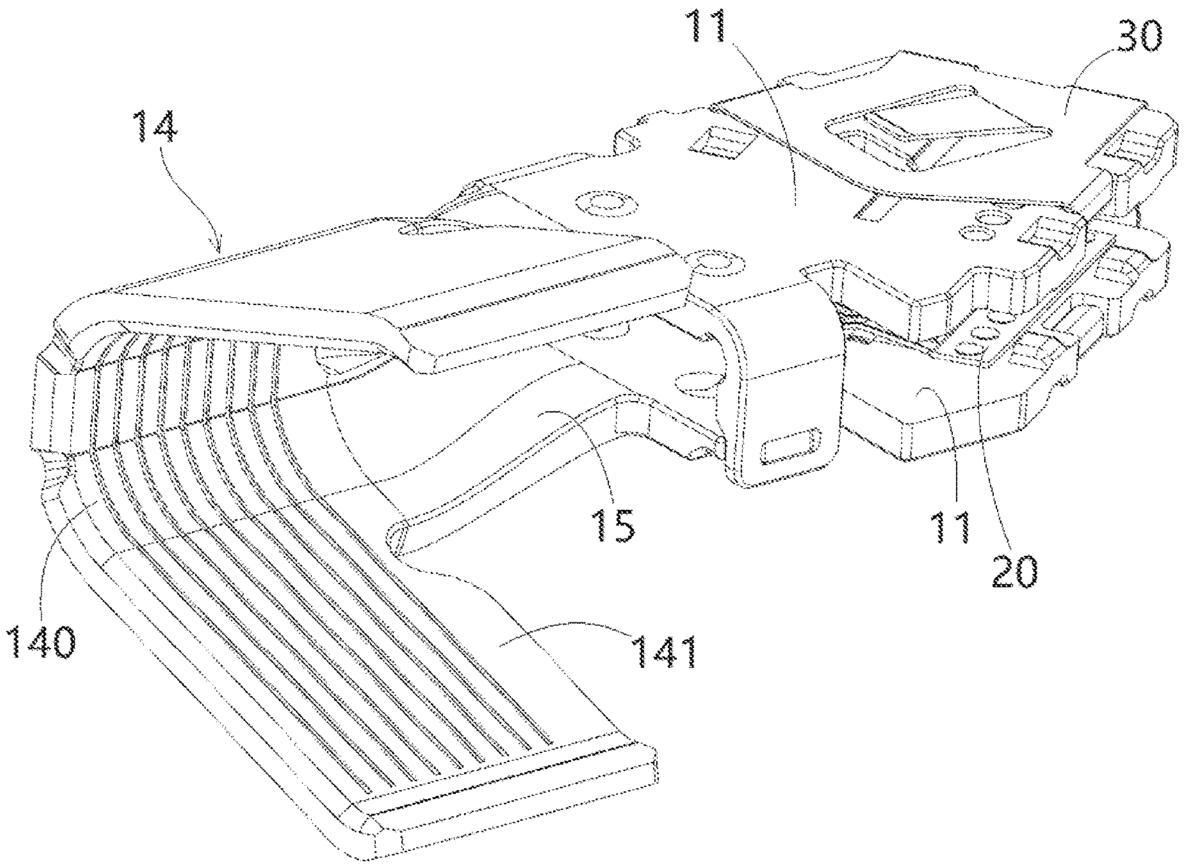
FIG. 6 is an illustrative perspective view of a terminal according to another exemplary embodiment of the present invention.

FIG. 6 shows an illustrative perspective view of a terminal according to another exemplary embodiment of the present invention. Compared with the terminals shown in FIGS. 1-5, the terminal shown in FIG. 6 includes distinct features of the electrical connection to the wire/cable. The other features of the terminal shown in FIG. 6 are essentially the same as those shown in FIGS. 1-5, and can be referred to the terminal shown in these figures.

As shown in FIG. 6, in the illustrated embodiment, the terminal body 10 further includes a crimping part 14 and a connecting part 15. The crimping part 14 is crimped onto the conductor end of the wire. The crimping part 14 includes a U-shaped body part 140 and a pair of side wing parts 141. The pair of wing parts 141 are connected on both sides of the opening of the U-shaped body part 140. The connection part 15 is connected between the U-shaped body part 140 and the pair of terminal plates 11.

Referring generally to FIGS. 1-6, in another exemplary embodiment of the present invention, a connector is also disclosed. The connector includes a housing and the aforementioned terminal 1, which is inserted into the housing. In another exemplary embodiment of the present invention, a connector assembly is also disclosed. The connector assembly includes a connector and a mating connector. The connector is mated with the mating connector. The mating terminal of the mating connector is inserted into the connector along the extension direction Y1 of the elastic arm 23 of the elastic contact member 20 of the connector.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A terminal, comprising:

a terminal body including a pair of terminal plates spaced opposite each other in a height direction; and a pair of elastic contact members arranged on respective inner sides of the pair of terminal plates, each elastic contact member including an elastic arm having an extension direction inclined at a non-right angle with respect to a length direction of the terminal body, the elastic arms adapted to clamp a mating terminal inserted therebetween along the extension direction to achieve electrical connection between the terminal and the mating terminal, each terminal plate has an inclined side edge perpendicular to the extension direction, a pair of support protrusions are formed on the inner sides of the terminal plates and are located at respective ends of the inclined side edges and extend along the extension direction of the elastic arm, the support protrusions on the pair of terminal plates are adapted to support the mating terminal inserted between the pair of elastic contact members to prevent the elastic arms from being excessively pressed by the mating terminal.

2. The terminal according to claim 1, wherein the angle between the extension direction of the elastic arm and the length direction of the terminal body is greater than 90 degrees and less than 180 degrees.

3. The terminal according to claim 1, wherein the elastic contact member includes multiple elastic arms arranged in a row along a direction perpendicular to the extension direction of the elastic arm.

4. The terminal according to claim 1, wherein the terminal body has a mating port defined between the inclined side edge portions of the pair of terminal plates and adapted to receive the mating terminal.

5. The terminal according to claim 4, wherein:

the elastic contact member further includes a first side edge portion and a second side edge portion opposite to each other in the extension direction of the elastic arm, the elastic arm connected between the first side edge portion and the second side edge portion; and the first side edge portion is arranged adjacent to the inclined side edge and is fixed to the inner side of the terminal plate, and the second side edge is arranged opposite the inclined side edge and is slidably supported on the inner side of the terminal plate.

6. The terminal according to claim 5, wherein a riveting hole is formed in the first side edge portion, and a rivet is inserted into the riveting hole to rivet the first side edge portion to the inner side of the terminal plate.

7. The terminal according to claim 6, wherein:

the first side edge portion and the second side edge portion extend in a direction perpendicular to the extension direction of the elastic arm; and a plurality of riveting holes are formed in the first side edge portion and are arranged in a row along the extension direction of the first side edge portion.

8. The terminal according to claim 4, wherein the terminal plate further includes:

a first side edge;

a second side edge opposite to the first side edge in a width direction of the terminal body; and a third side edge connected between one end of the second side edge and one end of the inclined side edge, wherein the inclined side edge is connected between one end of the first side edge and one end of the third side edge.

9. The terminal according to claim 8, wherein the first side edge and the second side edge extend along the length direction of the terminal body, and the third side edge is perpendicular to the inclined side edge.

10. The terminal according to claim 8, further comprising a locking member sleeved on ends of the pair of terminal plates of the terminal body and adapted to lock the terminal in a connector housing.

11. The terminal according to claim 10, wherein the locking member includes:

a bottom plate fixed to an outer side of one of the terminal plates;

a top plate fixed to an outer side of the other one of the terminal plates; and an end plate connected between the bottom plate and the top plate, wherein the end plate faces the third side edges of the pair of terminal plates and abuts the third side edge.

12. The terminal according to claim 11, wherein a positioning protrusion is formed on the third side edge of the terminal plate, and a positioning slot hole is formed in the end plate of the locking member, the positioning protrusion is assembled into the positioning slot hole.

13. The terminal according to claim 11, wherein a positioning notch and a limiting tongue extending into the positioning notch are formed on each of the inclined side edge and the second side edge of the terminal plate.

14. The terminal according to claim 13, wherein an elastic clamping part is formed on a side edge of each of the bottom plate and the top plate of the locking member and is positioned in the positioning notch and clamps the limiting tongue.

15. The terminal according to claim 11, wherein a locking spring is formed on each of the bottom plate and top plate of the locking member and is adapted to engaged with the connector housing to lock the terminal in the connector housing.

16. The terminal according to claim 1, wherein:

a raised rib is formed on the inner side of the terminal plate and extends in a direction perpendicular to the extension direction of the elastic arm;

the raised rib on the terminal plate is adapted to support the elastic arm to prevent excessive deformation of the elastic arm.

17. The terminal according to claim 1, wherein the terminal body further comprises:

a welding part adapted to be welded to a conductor end of a wire, including:

a pair of welding plates stacked vertically and riveted together with each other; and a bent connection part connected between one sides of the pair of welding plates;

a first bending part connected between one end of one of the welding plates and one end of one of the terminal plates; and a second bending part connected between one end of the other one of the welding plates and one end of the other one of the terminal plates.

18. The terminal according to claim 1, wherein the terminal body further comprises:

a crimping part adapted to be crimped onto a conductor end of a wire, including:

a U-shaped body part; and a pair of side wing parts connected to each of two sides of an opening of the U-shaped body part; and a connecting part connected between the U-shaped body part and the pair of terminal plates.

19. A terminal, comprising:

a terminal body including a pair of terminal plates spaced opposite each other in a height direction; and a pair of elastic contact members arranged on respective inner sides of the pair of terminal plates, each elastic contact member including an elastic arm having an extension direction inclined at a non-right angle with respect to a length direction of the terminal body, a first side edge portion, and a second side edge portion opposite to each other in the extension direction of the elastic arm, the elastic arms adapted to clamp a mating terminal inserted therebetween along the extension direction to achieve electrical connection between the terminal and the mating terminal, the elastic arms respectively connected between one first side edge portion and one second side edge portion, each terminal plate has an inclined side edge perpendicular to the extension direction of the elastic arm, the first side edge portions are respectively arranged adjacent to the inclined side edges and are fixed to respective inner sides of the terminal plates, and the second side edges are respectively arranged opposite the inclined side edges and are slidably supported on respective inner sides of the terminal plates, a riveting hole is formed in each first side edge portion, one rivet is inserted into each riveting hole to rivet each first side edge portion to the inner side of one terminal plate.

20. A terminal, comprising:

a terminal body including a pair of terminal plates spaced opposite each other in a height direction;

a pair of elastic contact members arranged on respective inner sides of the pair of terminal plates, each elastic contact member including an elastic arm having an extension direction inclined at a non-right angle with respect to a length direction of the terminal body, the elastic arms adapted to clamp a mating terminal inserted therebetween along the extension direction to achieve electrical connection between the terminal and the mating terminal; and a locking member sleeved on ends of the pair of terminal plates of the terminal body and adapted to lock the terminal in a connector housing.

* * * * *